May 8, 1945.  E. McDERMOTT  2,375,570
SEISMIC DETECTOR SYSTEM
Filed Feb. 5, 1935
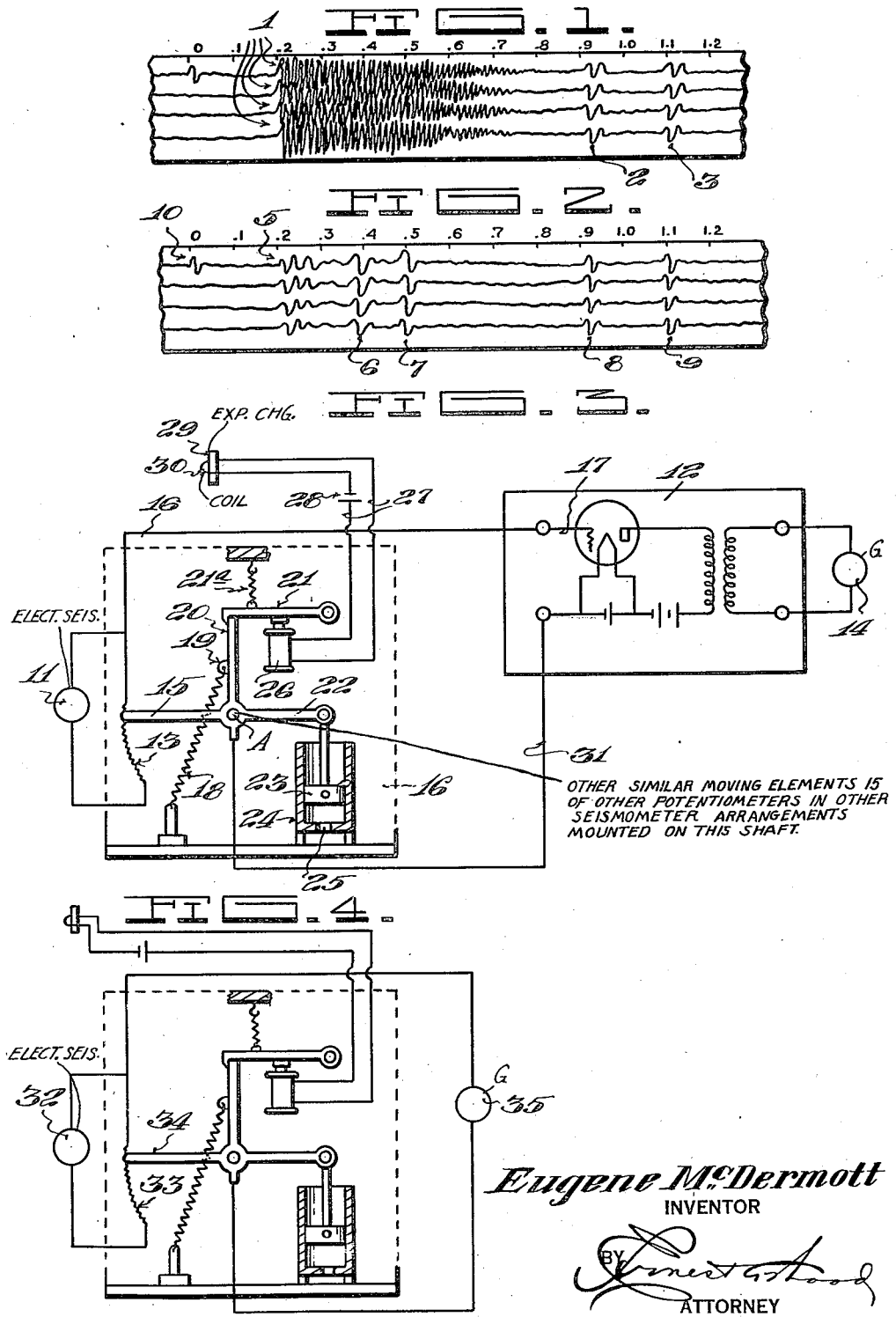

Patented May 8, 1945

2,375,570

UNITED STATES PATENT OFFICE 2,375,570

SEISMIC DETECTOR SYSTEM

Eugene McDermott, Dallas, Tex., assignor to Geophysical Service Incorporated, Dallas, Tex.

Application February 5, 1935, Serial No. 5,063

1 Claim. (Cl. 177—352)

This invention relates to a method for determining subsurface geological structures, and it has particular reference to an electrical seismic detector system in which the structure is determined by measuring the time of travel of artificially generated elastic waves in the earth.

The principal object of the invention is to provide a method of automatically varying the sensitivity of the system in accordance with a predetermined function of time.

With the foregoing object as paramount, the invention has particular reference to the several novel steps in the method to be hereinafter set forth and illustrated in the accompanying drawing, wherein—

Figure 1 is a sample of a record illustrating results obtained by conventional methods.

Figure 2 is an example of a record obtained by the use of the improved system herein described.

Figure 3 is a diagrammatic illustration of an apparatus for carrying out the steps of the improved method, and Figure 4 is a diagrammatic illustration of a modified form of apparatus for carrying out the steps of the hereindescribed method.

It is common practice to use electrical seismic detectors either directly actuating a recording galvanometer or indirectly through a vacuum tube amplifier. Seismic detectors are instruments which are placed on or near the surface of the ground and manifest the motion of the ground by a variation in their electrical output. This electrical output is usually magnified by means of a vacuum tube amplifier and caused to actuate a galvanometer. The motion of this galvanometer is then photographed.

When an elastic wave is initiated at or near the surface of the earth, as for instance by means of a charge of dynamite, it travels downward in an approximately spherical wave front. The energy in the wave front at any given time is an inverse function of the square of the distance of the wave front from the source. It follows therefore that the amplitude in a given type of earth material will vary inversely as the distance of the wave front from the source. These are well known physical principles. These elastic waves are reflected at the interfaces of any two strata of different physical constants. The density and elastic constant, especially the latter, are the physical constants involved. After reflection, part of the wave energy is returned to the surface of the earth. The consequent motion of the surface may be detected in the well known manner outlined above. It is apparent that the amplitude of motion at the surface will depend, among the factors, on the depth of the reflecting interface, and, as shown above, will be an approximately inverse linear function of the depth of the reflecting interface. The slight divergence from linearity will be caused by the non-homogeneity of the earth.

The present system of sensitivity control of the seismic detector system should not be confused with the ordinary volume control of a radio receiving system. In the latter case the sensitivity of the radio receiving system is caused to vary as an inverse function of the amplitude of the received signal rather than as a linear function of the time of arrival of the event, as herein described for the seismic detector system. The radio receiving system of sensitivity control would be distinctly disadvantageous for use in the seismic detector system. It would result in all reflection events being reduced to the same amplitude regardless of time of arrival or amplitude of ground motion. This would not permit making any discrimination between the efficiencies of the reflecting interfaces. The purpose of the present system is merely to compensate for the difference in energy of the different reflected waves due only to the inequality of length of path of travel.

With the present invention, the sensitivity of the seismic recording system is caused to vary linearly with the time of travel of the reflected wave. As the time of travel of the reflected wave is proportional to the depth of the reflecting interface, it is obvious that the recorded amplitude of the reflected wave will be independent of the depth, due to the predetermined sensitivity variation of the recording system above mentioned, provided of course that the reflection efficiency of the interface does not change. In ordinary practice in the use of the reflection seismograph, the arrival of several reflections from interfaces of different depths below the surface are recorded on the same strip of photographic paper. Heretofore, in view of the fact that the amplitudes of the various reflected waves from the different interfaces of unequal depth are quite different, it was necessary to initiate a number of independent elastic waves of different initial amplitude to obtain a readable record of all the reflections. This is accomplished by exploding a number of different charges of dynamite and photographing the resulting earth motion on different photographic strips. A sample record shown in Figure 1 indicates the impossibility of interpreting the record throughout its entire length due to the very large amplitudes of the galvanometer strings for the shorter times. The time scale in tenths of seconds, is shown at the top of the record, the initial arrival of energy is indicated at 1, and two reflections are indicated at 2 and 3. In Figure 1, four galvanometer elements are photographed on the same strip as it is common practice to use at least this number of detector systems, the detectors being placed on the ground at different distances from the source of the elastic wave. Now by combining this well known system with means of varying the sensitivity of the system in accordance with an approximately linear function of time it is apparent that the amplitudes of the reflections from interfaces of different depths below the surface will be approximately equal if the coefficients of reflections at the different interfaces are equal. The time is measured from the time of initiation of the elastic wave. With this combination a record of the type shown in Figure 2 will be obtained. The initial arrival of energy is indicated at 5, several reflections are indicated at 6, 7, 8 and 9 and the time of initiation of the elastic wave is indicated at 10.

The reflections indicated at 8 and 9 are identical with those shown at 2 and 3 in Figure 1. In addition, reflection events 6 and 7 are clearly readable due to the reduction in amplitude effected in the manner described herein. It is apparent therefore that a single record is more useful in this case, and the number of explosive charges necessary to obtain the required information will be greatly reduced.

In Figure 3 is indicated one method of obtaining this result. A detector 11 is connected to an amplifier 12 through the medium of a potentiometer 13. Amplifier 12 is of course connected to a galvanometer 14. The moving element 15 of the potentiometer 13 is actuated by means of a timing device 16 causing it to move through its entire range in accordance with a predetermined function of time. In moving over this range the voltage impressed on the grid 17 of the amplifier 12 is caused to vary from zero to the full voltage of the detector 11. In Figure 3 is also indicated one of several forms of timing devices that may be employed to actuate the potentiometer. A coiled spring 18 is attached to an ear 19 on the potentiometer arm 20. The moving element 15 of the potentiometer is integral with the arm 20. When the shaft A is turned so that the moving element 15 is at the zero position, the spring 18 is under tension as shown in Figure 3, which is the position of minimum sensitivity. The shaft A is held in this position by a trigger 21 as shown. An arm 22 on the shaft 19 is attached to a piston 23, which moves in a dashpot 24. A small opening 25 in the dashpot 24 controls the flow of air. By varying the size of this opening, the motion of the piston 23 may be controlled and consequently the motion of the shaft A and the moving element 15 of the potentiometer after the trigger 21 is released. The trigger 21 may be released either manually or automatically as shown. The electromagnet 26 may be actuated by an electrical current flowing through the circuit 27 containing a battery 28.

The circuit 27, when broken by the explosion of the charge of dynamite 29 about which the coil 30 is wound, deenergizes the magnet 26 and releases the trigger 21 to the action of the spring 21a. The explosion of the charge causes the initiation of elastic waves in the earth. Simultaneously, the moving element 15 of the potentiometer will rotate and will thus vary the sensitivity of the system according to a predetermined function of time, which function will depend on the size of the opening 25 in the dashpot 24. The wire 31 connects the moving shaft of the potentiometer to the amplifier and if desirable, the motion of the moving element may be initiated manually.

In case an amplifier is not employed, the potentiometer may be connected between the detector and the galvanometer as shown in Figure 4. The detector is indicated at 32 connected to the potentiometer resistance element 33. The moving element 34 of the potentiometer is caused to vary in point of time as described above. The galvanometer 35 is connected to the potentiometer as shown.

The sensitivity of the system may thus be raised in accordance with a predetermined function of time. Any number of potentiometer moving elements may be mechanically coupled together and operated simultaneously, thus causing a sensitivity variation to occur simultaneously in any number of seismic detector systems.

Several devices other than the one described above may be employed to accomplish the desired result. It is well known that the sensitivity of a vacuum tube amplifier may be caused to vary by changing the voltage on the grid of any tube in the amplifier. Furthermore, by the choice of the proper range of grid voltage, it is possible to cause the sensitivity to vary in an approximately linear fashion with the changing grid voltage. By causing this grid voltage to vary as an approximate inverse linear function of time, the sensitivity of the system as a whole will vary linearly. A variable grid voltage may be obtained by means of the potentiometer method above described.

What is claimed is:

Apparatus for seismic surveying comprising, a plurality of spaced seismometers for converting seismic waves into electrical waves, a plurality of channels for transmitting these electrical waves to a recorder and a recorder arranged to record the waves from the respective channels on a single record for comparison, each of said channels including an amplification stage and an attenuation device, said attenuation devices each comprising a variable resistance for reducing the strength of the high energy waves, and means for varying said resistances in unison with each other to effect a reduction in attenuation as the incoming signals become weaker.

EUGENE McDERMOTT.